United States Patent
Wyatt et al.

(10) Patent No.: US 11,458,428 B2
(45) Date of Patent: Oct. 4, 2022

(54) PARTICULATE SEPARATOR FOR ENGINE AIR CLEANER

(71) Applicants: Colton C Wyatt, Lake Orion, MI (US); Caroline S Rhee, Farmington Hills, MI (US)

(72) Inventors: Colton C Wyatt, Lake Orion, MI (US); Caroline S Rhee, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/167,755

(22) Filed: Feb. 4, 2021

(65) Prior Publication Data
US 2022/0241711 A1 Aug. 4, 2022

(51) Int. Cl.
| | | |
|---|---|---|
| *B01D 50/00* | (2022.01) | |
| *B01D 45/16* | (2006.01) | |
| *F02M 35/024* | (2006.01) | |
| *F02M 35/022* | (2006.01) | |
| *F02M 35/02* | (2006.01) | |
| *B01D 50/20* | (2022.01) | |
| *F02M 35/08* | (2006.01) | |

(52) U.S. Cl.
CPC ............. *B01D 45/16* (2013.01); *B01D 50/20* (2022.01); *F02M 35/0201* (2013.01); *F02M 35/0223* (2013.01); *F02M 35/0226* (2013.01); *F02M 35/02416* (2013.01); *F02M 35/08* (2013.01)

(58) Field of Classification Search
CPC .. B01D 45/16; B01D 50/002; F02M 35/0201; F02M 35/0223; F02M 35/0226; F02M 35/02416; F02M 35/08
See application file for complete search history.

(56) References Cited

U.S. PATENT DOCUMENTS

| | | | | |
|---|---|---|---|---|
| 1,931,193 A | * | 10/1933 | Hawley | B04C 3/00 55/396 |
| 2,936,043 A | * | 5/1960 | Armstrong | B04C 5/13 55/416 |
| 3,360,909 A | * | 1/1968 | Barnerias | B04C 3/04 55/348 |
| 3,362,155 A | * | 1/1968 | Driscoll | F02C 7/05 60/39.092 |
| 3,420,040 A | * | 1/1969 | Neely | B04C 5/06 55/346 |
| 3,885,935 A | * | 5/1975 | Nutter | B04C 3/00 55/457 |

(Continued)

*Primary Examiner* — Dung H Bui
(74) *Attorney, Agent, or Firm* — Ralph E. Smith (57) ABSTRACT

A particulate separator includes a housing, and air guide, and an outlet body. The housing has an inlet through which air enters an interior, a first outlet and a second outlet. The air guide is carried by the housing between the inlet and the first outlet, and has deflectors and flow paths between adjacent deflectors, the flow paths communicating with the housing interior. The outlet body has a central portion and a wall extending outwardly from the central portion. The central portion is received at least partially within the interior of the housing with a space defined between an outer surface of the central portion and an inner surface of the housing, and the central portion has an opening through which air flows through the outlet body, and the wall encloses the space so that air that flows around the central portion is blocked by the wall.

14 Claims, 5 Drawing Sheets

(56) References Cited

U.S. PATENT DOCUMENTS

| | | | |
|---|---|---|---|
| 3,895,930 A * | 7/1975 | Campolong | B04C 3/00 55/394 |
| 4,050,913 A * | 9/1977 | Roach | B01D 50/002 96/381 |
| 4,159,899 A | 7/1979 | Deschenes | |
| 4,242,115 A * | 12/1980 | Harold | B01D 45/16 55/347 |
| 4,255,174 A * | 3/1981 | Simpson | B01D 45/16 55/347 |
| 4,311,494 A * | 1/1982 | Conner | B01D 45/16 55/394 |
| 4,420,314 A * | 12/1983 | Barron, Jr. | B04C 5/06 55/436 |
| 4,537,608 A * | 8/1985 | Koslow | B01D 46/48 55/337 |
| 4,985,058 A * | 1/1991 | Prinsloo | B04C 3/06 55/457 |
| 5,403,367 A * | 4/1995 | De Villiers | B01D 50/002 55/320 |
| 5,498,273 A * | 3/1996 | Mann | B01D 45/12 55/396 |
| 6,319,304 B1 | 11/2001 | Moredock | |
| 6,540,802 B2 * | 4/2003 | Trautmann | F02M 35/10059 55/337 |
| 6,540,917 B1 * | 4/2003 | Rachels | B04C 3/00 210/512.1 |
| 7,311,744 B2 * | 12/2007 | Elliott | B01D 45/16 55/396 |
| 7,637,978 B2 * | 12/2009 | Jung | F02M 35/022 55/457 |
| 8,951,337 B2 | 2/2015 | Tofsland et al. | |
| 9,539,533 B2 * | 1/2017 | Schulz | B01D 46/24 |
| 10,406,467 B2 * | 9/2019 | Billiet | B04C 5/103 |
| 2002/0144599 A1 * | 10/2002 | Afeiche | B01D 45/16 95/269 |
| 2004/0025481 A1 * | 2/2004 | Bugli | B01D 45/16 55/392 |
| 2007/0234903 A1 * | 10/2007 | Xu | F02M 35/022 95/267 |
| 2012/0103423 A1 * | 5/2012 | Schook | B04C 3/06 137/1 |
| 2014/0298761 A1 * | 10/2014 | Ackermann | B01D 45/16 55/457 |
| 2018/0361288 A1 * | 12/2018 | Nie | B01D 45/12 |
| 2020/0318918 A1 * | 10/2020 | Brooks | F28F 25/02 |
| 2020/0353394 A1 * | 11/2020 | Chen | B01D 45/16 |
| 2021/0060582 A1 * | 3/2021 | Son | B04C 5/103 |
| 2021/0102522 A1 * | 4/2021 | Parikh | B01D 46/26 |
| 2021/0370209 A1 * | 12/2021 | Chastain, Jr | B01D 45/16 |

\* cited by examiner

PARTICULATE SEPARATOR FOR ENGINE AIR CLEANER

FIELD

The present disclosure relates to a particulate separator used to remove at least some particulate matter from air flowing to an engine air cleaner.

BACKGROUND

Vehicles include air filters through which air is passed prior to being fed to an engine. The air filter removes at least some contaminants like dust, sand and the like, so that such contaminants are not passed through to the engine. In some environments, for example, where sand is prevalent or where the air includes higher concentrations of such contaminants, the air filter may become clogged more quickly. In addition to shortening the service life of the air filter, a clogged air filter can restrict air flow to the engine, and affect engine performance.

SUMMARY

In at least some implementations, a particulate separator assembly includes a housing, and air guide, and an outlet body. The housing has an interior, an inlet through which air enters the interior, a first outlet adapted to communicate with an air filter, and a second outlet. The air guide is carried by the housing between the inlet and the first outlet, the air guide has multiple deflectors that define multiple flow paths between adjacent ones of the multiple deflectors, the flow paths communicating with the interior of the housing. The outlet body has a central portion and a wall extending outwardly from the central portion. The central portion is received at least partially within the interior of the housing with a space defined between an outer surface of the central portion and an inner surface of the housing, and the central portion has an opening through which air flows through the outlet body, and the wall encloses the space so that air that flows around the central portion is blocked by the wall.

In at least some implementations, the second outlet communicates with the space and the second outlet is formed through a lower portion of the housing relative to gravity. In at least some implementations, a particulate guide is located above the second outlet with respect to gravity and arranged to direct particulates in an airflow within the space toward the second outlet.

In at least some implementations, the second outlet is defined at least in part by a drain valve having opposed flaps and wherein air and particulate matter may flow through the drain valve when the flaps are at least partially separated from each other and wherein air and particulate matter does not flow through the drain valve when the flaps are fully engaged. The flaps may be spaced apart from each other at a first end spaced from an outlet of the drain valve and the flaps may be angled so that at a second end, the flaps are engaged with each other. In at least some implementations, the flaps are integrally formed in a body of the drain valve that is carried by the housing, and the body includes two weights with one weight carried by each flap between the first end and second end, and the weights are embedded within the material of the body.

In at least some implementations, the deflectors are radially arranged relative to a central axis of the air guide, and the deflectors are tapered and have a leading edge is thicker than a trailing edge, where the thickness is measured in the circumferential direction. In at least some implementations, the deflectors are connected at a radially inner edge to a central body that has a smaller cross-sectional area at an upstream end than at a downstream end, where upstream and downstream are relative to the primary direction of air flow through the air guide. In at least some implementations, the trailing edge has a circumferential thickness that is one-third the thickness of the leading edge or less, and in some implementations may be one-tenth the thickness or less.

In at least some implementations, the housing interior has a central axis and an axial length of the interior between the air guide and the outlet body is at least 3 times greater than the axial length of the air guide, and in some implementations is at least 4 times greater.

In at least some implementations, an engine air cleaner assembly includes a main housing having an interior, an air filter received in the interior of the main housing and a separator. The separator has a separator housing that has an interior in communication with the main housing interior, the separator housing also having an inlet through which air enters the interior, a first outlet adapted to communicate with an air filter, and a second outlet. An air guide is carried by the separator housing between the inlet and the first outlet, the air guide has multiple deflectors that define multiple flow paths between adjacent ones of the multiple deflectors, the flow paths communicating with the interior of the separator housing. An outlet body has a central portion and a wall extending outwardly from the central portion, wherein the central portion is received at least partially within the interior of the separator housing with a space defined between an outer surface of the central portion and an inner surface of the separator housing, and the central portion has an opening through which air flows through the outlet body, and the wall encloses the space so that air that flows around the central portion does not exit through the first outlet. And one or more of (a), (b) and/or (c) is present:

a) the deflectors have a leading edge upstream of a trailing edge and the leading edge of at least some of the deflectors is circumferentially thicker than the trailing edge; or b) a particulate guide that is received over at least part of the second outlet, with respect to the direction of gravity, and within the space; or c) the interior of the separator housing has a length between the air guide and the outlet body that is at least 3 times greater than the axial length of the air guide.

In at least some implementations, the second outlet communicates with the space and the second outlet is formed through a lower portion of the separator housing relative to gravity. In at least some implementations, the second outlet is defined at least in part by a drain valve having opposed flaps and wherein air and particulate matter flow through the drain valve when the flaps are at least partially separated from each other and wherein air and particulate matter does not flow through the drain valve when the flaps are fully engaged. In at least some implementations, the flaps are spaced apart from each other at a first end spaced from the second outlet and the flaps are angled so that at a second end, the flaps are engaged with each other. In at least some implementations, the flaps are integrally formed in a body of the drain valve that is carried by the separator housing, and wherein the body includes two weights with one weight carried by each flap between the first end and second end, and wherein the weights are embedded within the material of the body.

In at least some implementations, a cross-sectional area of the air guide, taken in a plane perpendicular to the axis, is less than fifteen percent of the total area bounded by the air guide. In at least some implementations, a cross-sectional area of the air guide, taken in a plane perpendicular to the axis and through a leading edge of the deflectors, is greater than a cross-sectional area of the air guide taken in a plane perpendicular to the axis and through a trailing edge of the deflectors.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
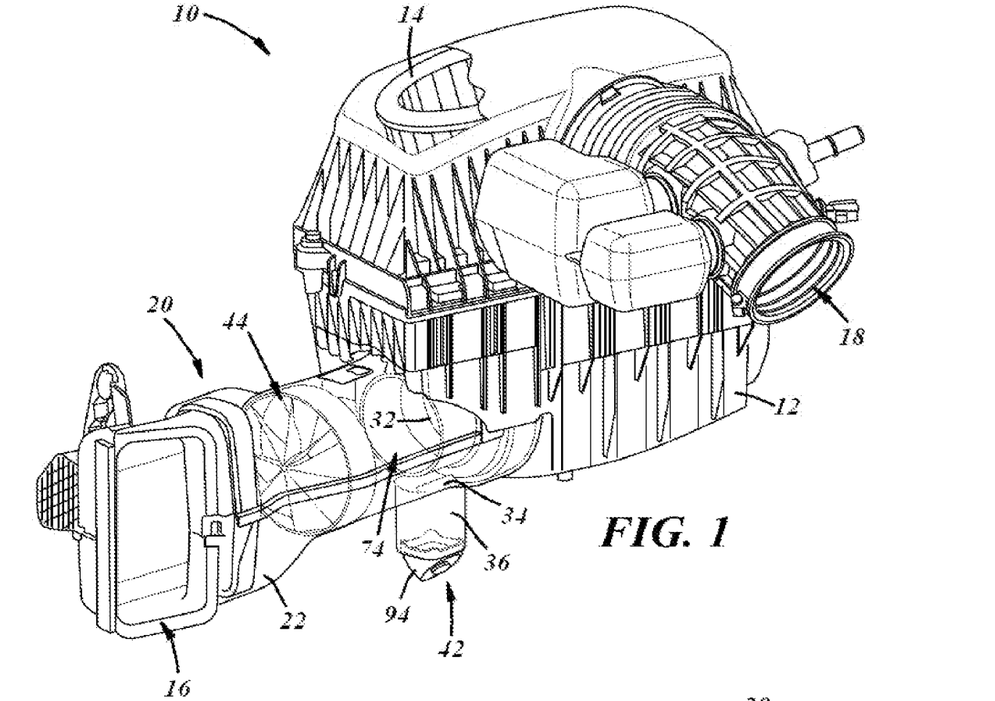
FIG. 1 is a perspective view of an air cleaner assembly for an engine, which includes a particulate separator.
Figure 2:
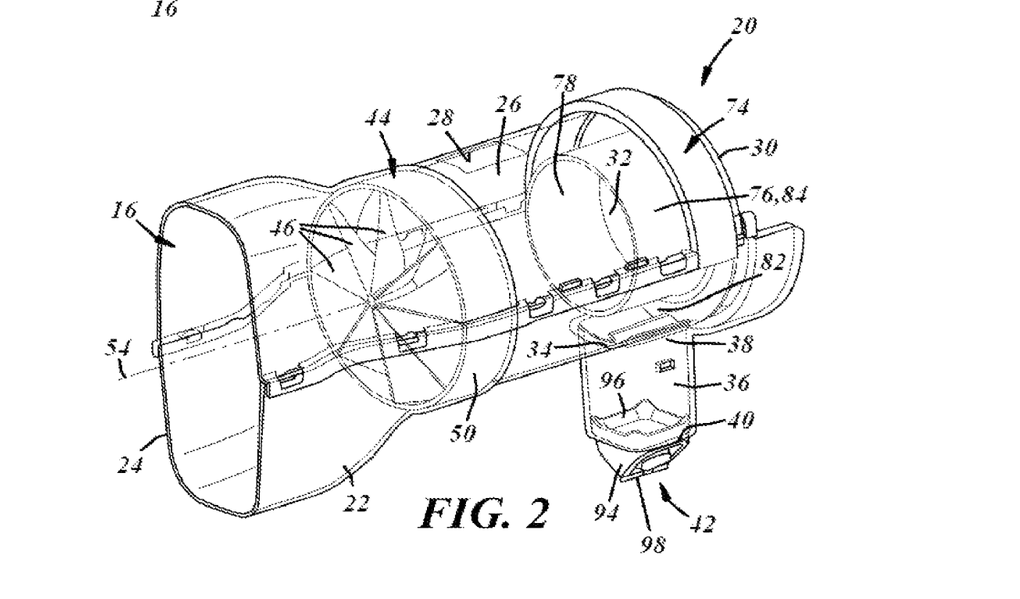
FIG. 2 is a perspective view of the particulate separator with a housing thereof shown transparent to reveal an air guide, an outlet body and a drain valve.
Figure 3:
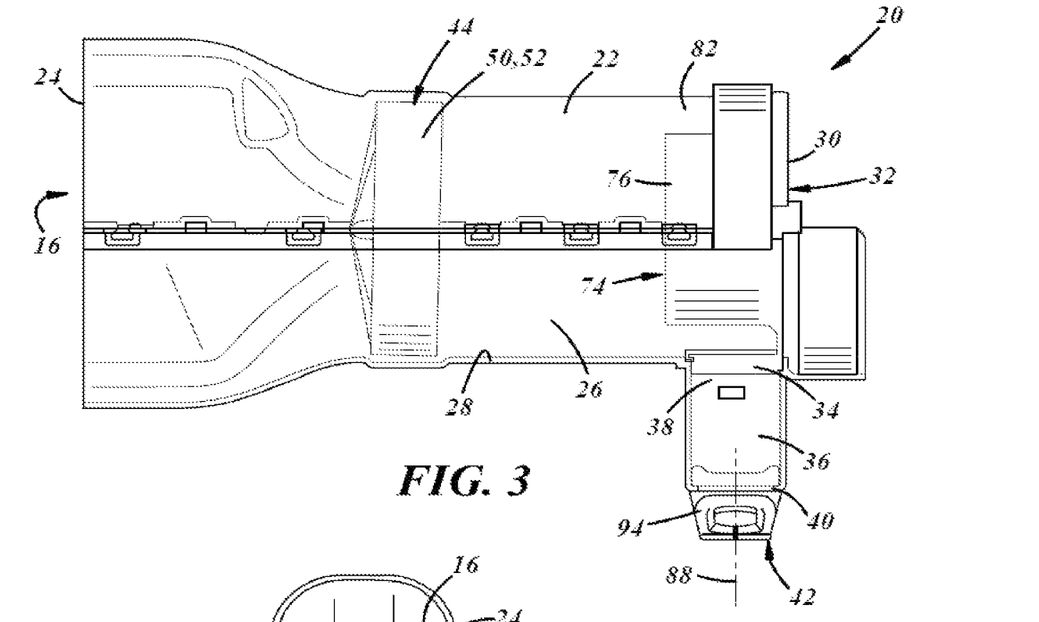
FIG. 3 is a side view of the particulate separator with the housing again shown transparent.
Figure 4:
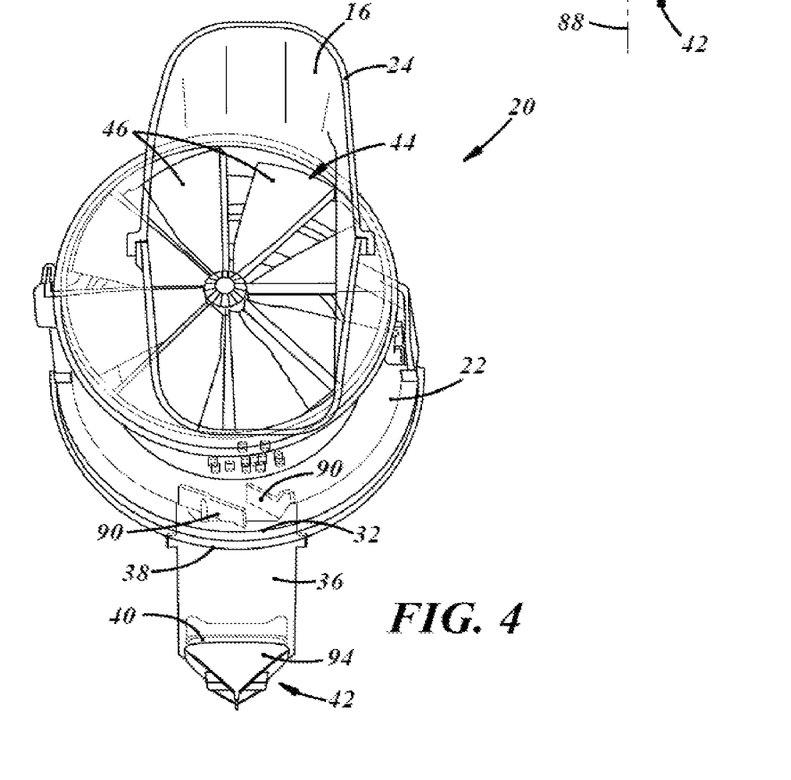
FIG. 4 is an end view of the particulate separator, taken in the direction of arrow 4 in FIG. 2.

Referring in more detail to the drawings, FIG. 1 illustrates an air cleaner assembly 10 for a vehicle engine via which contaminants are removed from an air flow before the air is fed into the engine. The air cleaner assembly 10 includes a main housing 12 in which a filter 14 is received, an inlet 16 into which air is received into the assembly 10, an outlet 18 from which air exits the assembly 10, and a particulate separator 20 between the inlet 16 and filter 14. Such a particulate separator 20 may be used, for example, in vehicles operating in dusty or sandy environments, or off-road vehicles that may be used on sand or dirt trails and roads. In such applications, particulates can clog air filter 14s, thereby causing air flow restrictions and decreasing the in-service life of the filter 14. Of course, a particulate separator 20 could be used on any desired vehicle.

The particulate separator 20 is arranged to remove contaminants (herein sometimes called particulates) from the air flow prior to the air filter 14. This reduces the contaminants that reach the air filter 14 and extends the useful life of the air filter 14. In other words, the particulate separator 20 is upstream of the filter 14. As used herein, where the terms "upstream" and "downstream" as used herein refer to the nominal direction of air flow in the air cleaner assembly. And the term nominal direction of airflow means from the inlet to the outlet, with the understanding that air may swirl or otherwise flow in a nonlinear manner, but ultimately still flows from the inlet to the outlet during engine operation.

As shown in FIGS. 1-4, the particulate separator 20 includes a housing 22 that may be formed separately from and then coupled to the main housing 12, or the housing 22 may be part of the main housing 12, as desired (e.g. as a feature in a unitary, molded body and not a separately formed component). The separator housing 22 is tubular and includes at a first end 24 an opening that defines the inlet 16 into which air is received into an enclosed interior 26 of the housing 22 that is bounded at least in part by an inner surface 28 of the housing 22. The opening/inlet 16 may have any desired shape and may have a constant or changing flow area (i.e. cross-sectional area) to provide a desired flow rate of air into and through the housing. At a second end 30, the housing 22 is coupled to or transitions to the main housing 12 and a first outlet 32 (FIGS. 1 and 2) communicates the housing interior 26 with the main housing interior and a filter 14 therein. Adjacent to the second end 30, the housing 22 may include a second outlet 34 which may lead to or be defined in a drain chamber 36 that is open at one end 38 to the housing interior 26. At its other end 40, the drain chamber 36 may include a drain valve 42 that selectively permits material in the drain chamber 36 to exit the housing 22, as will be described in more detail below.

Figures 7, 8:
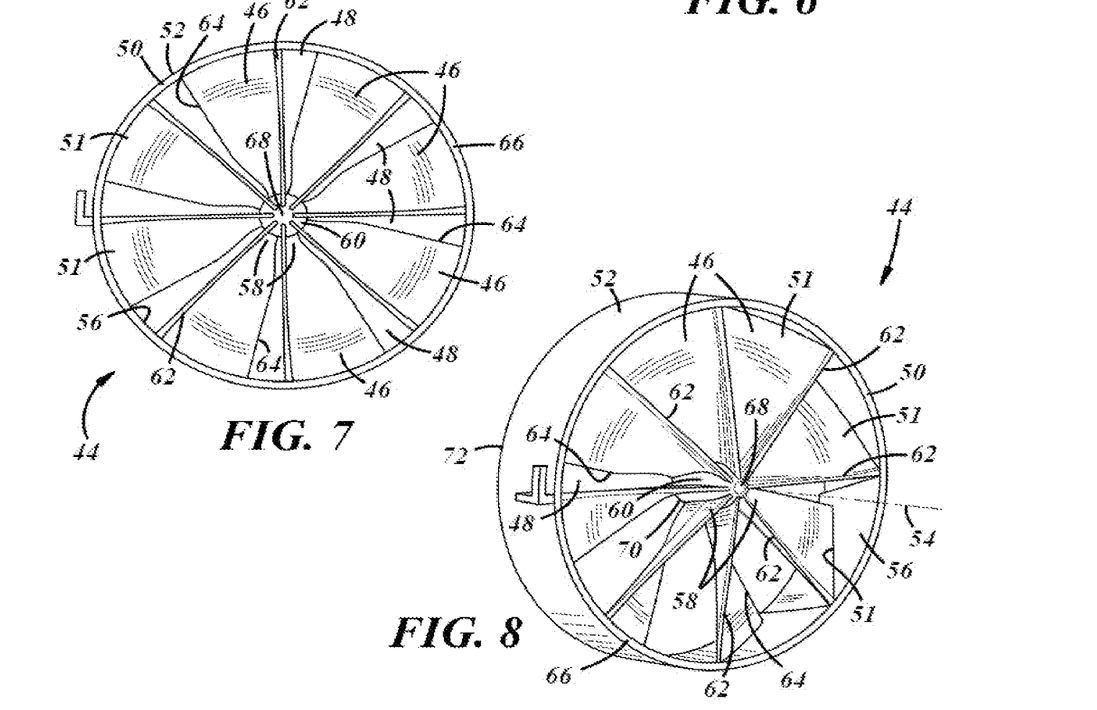
FIG. 7 is a front view of the air guide.
FIG. 8 is a perspective view of the air guide.

At or downstream from the first end 24 of the housing 22, within the interior 26 and upstream from the first outlet 32 and second outlet 34, the particulate separator assembly 20 includes an air guide 44. As shown in FIGS. 7 and 8, the air guide 44 includes multiple deflectors 46 that define between them multiple flow paths 48. To facilitate separation of particulates from the air flowing through the housing interior 26, the deflectors 46 are designed and arranged to direct air outwardly toward the inner surface 28 of the housing 22, and to cause a spiral, helical or circular movement of the air as the air flows through the interior 26. This provides a centrifugal force on the particulates which then tend to move outwardly, toward the inner surface 28 of the housing 22. In at least some implementations, six to twelve deflectors are provided.

In the example shown, the air guide 44 includes a peripheral sidewall 50 and each deflector 46 is connected at a radially outer end 51 to the sidewall 50. An exterior or outer surface 52 of the sidewall 50 may have the same shape as the inner surface 28 of the portion of the housing 22 in which the air guide 44 is received, which in this example is circular. The sidewall 50 may be circumferentially continuous, where the terms radial, axial and circumferential are relative to a central axis 54 (labeled in FIGS. 2 and 8) of the air guide 44. Thus, the sidewall 50 has a length in the axial direction, a thickness in the radial direction, and circumference or periphery that extends circumferentially. In at least some implementations, the air guide 44 may be press-fit or otherwise fixed in position relative to the housing 22 such that the air guide 44 does not move relative to the housing 22.

Referring again to FIGS. 7 and 8, the deflectors 46 extend from their radially outer ends 51 that may be coupled or joined to an inner surface 56 of the sidewall 50, to a radially inner end 58. The inner ends 58 of the deflectors 46 may be joined together, and, in the example shown, are joined to a central body 60. The central body 60 may be coaxial with the sidewall 50 and the deflectors 46 may have the same radial length. The deflectors 46 have a leading edge 62 that is upstream from a trailing edge 64, with an axial width of each deflector 46 defined between the leading and trailing edges 62, 64.

Figure 12:
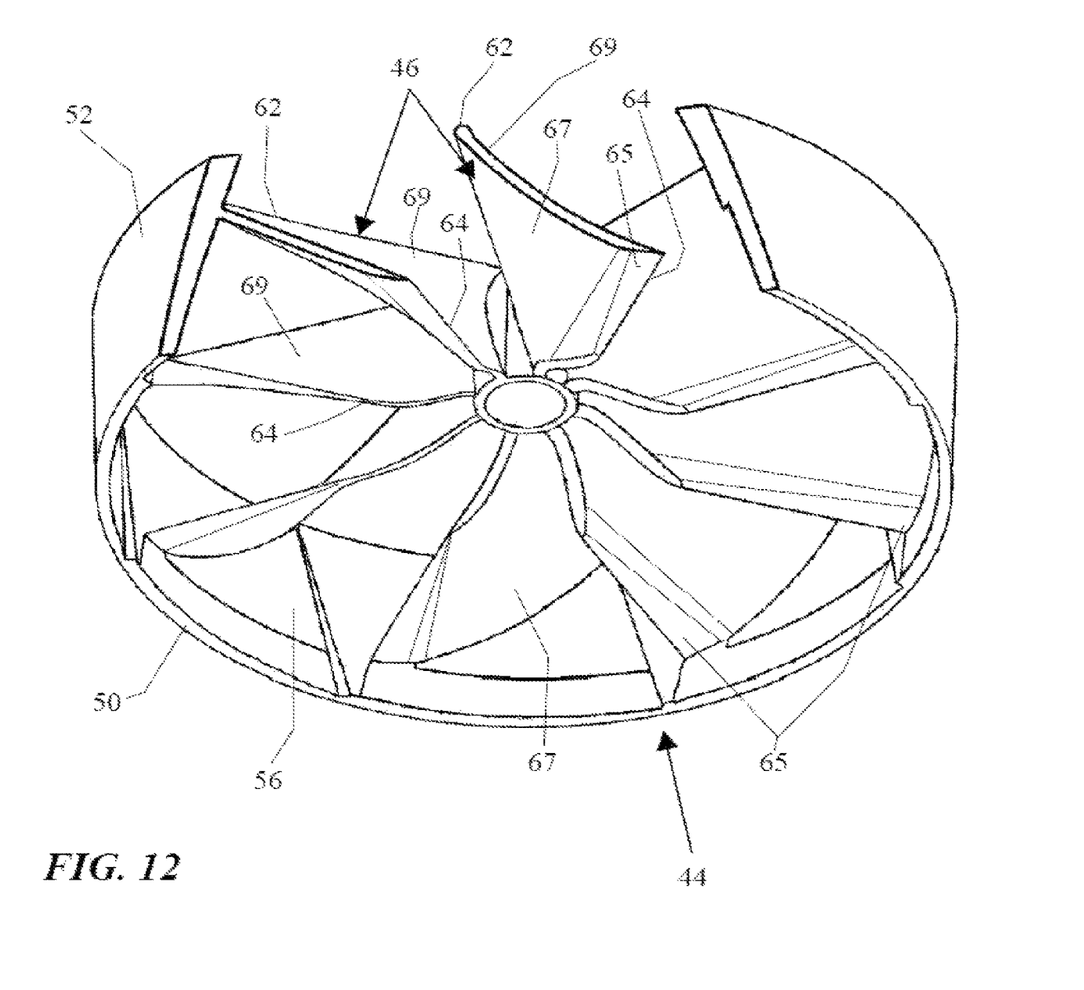
FIG. 12 is a perspective view of the air guide with a portion in section.

In at least some implementations, the deflectors 46 have a thickness, measured in the circumferential direction, that varies along the axial width of each or at least most of the deflectors 46. In the example shown, each deflector 46 has a greater thickness at its leading edge 62 than at its trailing edge 64, and the deflectors 46 may be uniformly tapered such that the thickness decreases uniformly from the leading edge 62 to the trailing edge 64. Or, as shown in FIG. 12, the thickness may be uniform along at least a majority of the axial length between the leading edge 62 and trailing edge 64, and the tapered portion 65 may be provided at the trailing edge and for less than half the axial dimension of the deflectors 46. In the example shown, the tapered portion is formed by a portion of the rear surface 67 of the deflectors 46 being angled toward the front surface 69 of the deflectors 46 and being arranged at an angle to the remainder of the rear surface 67 which may be parallel to or generally parallel to the front surface 69. The trailing edge 64 may be as thin as practical given the material and method used to form the air guide 44. In at least some implementations, the leading edge 62 may have a thickness between 1 mm and 3 mm.

Further, the deflectors 46 may be curved. The leading edge 62 of a deflector 46 at the radially outer end 51 may be connected to the sidewall 50 at a location that is axially and circumferentially offset from the location at which the trailing edge 64 is connected to the sidewall 50. In the example shown, and when looking at the upstream side 66 of the air guide 44 as in FIG. 7, the trailing edge 64 of each deflector 46 at the sidewall 50 is offset in a counter-clockwise direction relative to the leading edge 62 by between ten and sixty degrees, in at least some implementations. The trailing edge 64 of one deflector 46 may be circumferentially offset from the leading edge of the adjacent/nearest deflector 46 by between zero and twenty degrees, in at least some implementations. The radial inner end 58 of the deflectors 46 may be connected to the central body 60 and may extend axially from the leading edge 62 to the trailing edge 64 or within thirty degrees of the axial direction. While each deflector 46 is shown attached to both the sidewall 50 and the central body 60, at least some of the deflectors 46 could be connected to one or the other of the sidewall 50 and central body 60.

The central body 60 may be coaxial with the sidewall 50, and has an upstream end 68 and a downstream end 70. To encourage radially outward airflow, the central body 60 may be smaller in cross-sectional area at its upstream end 68 than at its downstream end 70. The smaller upstream end 68 may also provide a lower restriction or resistance to air flow.

To also reduce resistance to airflow through the air guide 44, the deflectors 46 may be circumferentially thinner (e.g. have a smaller dimension in the circumferential direction) than the flow paths 48 that are defined between adjacent deflectors 46. In at least some implementations, the cross-sectional area of the air guide 44, taken in a plane perpendicular to the axis 54, is less than fifteen percent, and may be less than ten percent, of the total area bounded by the air guide 44 (e.g. bounded by the outer surface 52 of the sidewall 50). Further, because the trailing edges 64 of the deflectors 46 are thinner than the leading edges 62, the airflow paths 48 are circumferentially wider at the downstream end of the air guide 44 than at the upstream end. This provides a diverging flow path between each deflector 46 that is narrower at the upstream side to increase velocity and wider at the downstream side 72 to avoid a restriction to the air flow, and the thinner downstream/trailing edges may instead or also reduce turbulence in the air flow. In this way, the construction of the air guide 44 reduces the overall restriction increase caused by the particulate separator (e.g. relative to a system without a particulate separator) to below three kPa static pressure drop at the maximum airflow rate of the engine.

Figure 5:
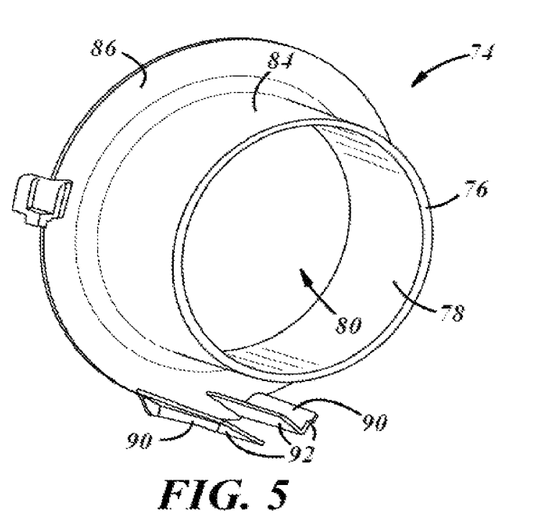
FIG. 5 is a perspective view of the outlet body.
Figure 6:
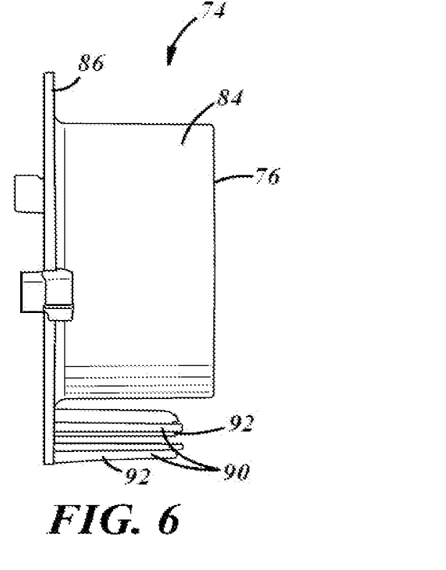
FIG. 6 is a side view of the outlet body.

Downstream from the air guide 44, an outlet body 74 is at least partially received in the housing 22. As shown in at least FIGS. 5 and 6, the outlet body 74 has a central portion 76 that is tubular and has an inner surface 78 that defines a passage 80 that is open to the first outlet 32. The central portion 76 is smaller than the area of the housing 22 in which it is received, and may be at least 40% smaller in some implementations, and a space 82 (FIGS. 2 and 3) is defined between the inner surface 28 of the housing 22 and an outer surface 84 of the central portion 76, surrounding all or part of the periphery of the central portion 76. Extending outwardly from the central portion 76, the outlet body 74 includes a wall 86 that defines a downstream end of the space 82, and which closes off the space 82 from the first outlet 32. Thus, only air and matter flowing through the passage 80 of the central body 60 exits through the first outlet 32. Air/matter in the space 82 is retained in the housing 22 and prevented from flowing through the first outlet 32 by the wall 86.

The space 82 is communicated with the second outlet 34 and air/matter in the second outlet 34 may exit the housing 22 through the second outlet 34, which is open to the drain chamber 36. The drain chamber 36 may extend downwardly from the housing interior 26 in the direction of gravity (e.g. a centerline or center axis 88 (FIG. 3) of the drain chamber 36 may be parallel to or in the direction of gravity). To guide particulates to the second outlet 34, one or both of the housing 22 and the outlet body 74 may include one or more particulate guides 90. In the example shown, the body includes two particulate guides 90 that extend axially away from the wall 86 and are radially spaced from the outer surface 84 of the central portion 76. The particulate guides 90 may be spaced apart with a gap between them through which air may flow. In assembly, the particulate guides 90 are located at least partially in the space 82, and are adjacent to and above the second outlet 34. The particulate guides 90 also partially cover the second outlet 34 and may reduce the volume and/or flow rate of air that flows through the second outlet 34. This may both reduce blowing and dispersion of particulates in the drain chamber 36 back into the housing interior 26, and also reduce air loss from the system which would result in less air making it to the engine.

A guide surface 92 of the particulate guides 90 is radially inclined and oriented to direct air and particulates toward the second outlet 34. In the example shown, one particulate guide 90 is V-shaped and has two converging, inclined guide surfaces 92 both angled toward the second outlet 34. Matter flowing in a first direction may engage one guide surface and be directed toward the second outlet 34 and matter flowing in the opposite, second direction may engage the other guide surface and be directed toward the second outlet 34. Particulates flowing in the space 82, around the central body 60, may engage the particulate guides 90 which tend to direct the particulates out of the air flow and into the second outlet 34. These particulates are then removed from the housing without flowing into the main housing 12 and the filter 14 therein. Particulate guides 90 could be connected to and extend from the central body 60, with or without being connected to the wall 86, as desired.

Matter that flows through the second outlet 34 is received within the drain chamber 36, which may be closed at one end by the drain valve 42. The drain valve 42 may be normally closed and some volume of matter (e.g. particulates) may collect in the drain chamber 36 when the drain valve 42 is closed. The matter within the drain chamber 36 may exit from the housing 22 and/or drain chamber 36 when the drain valve 42 is open.

Figure 9:
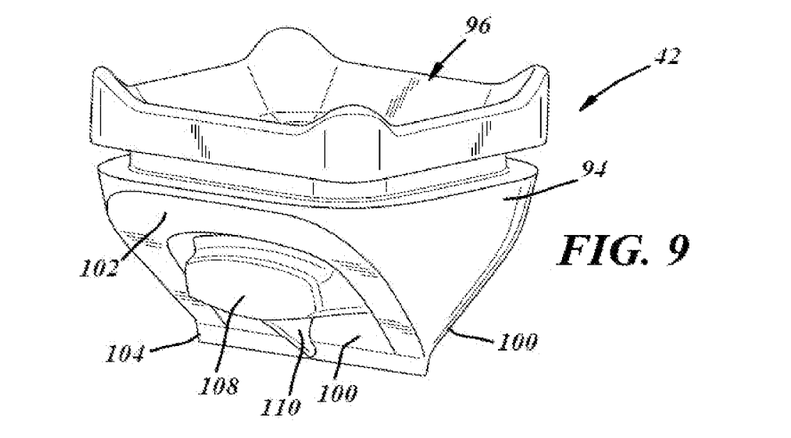
FIG. 9 is a perspective side view of the drain valve.
Figure 10:
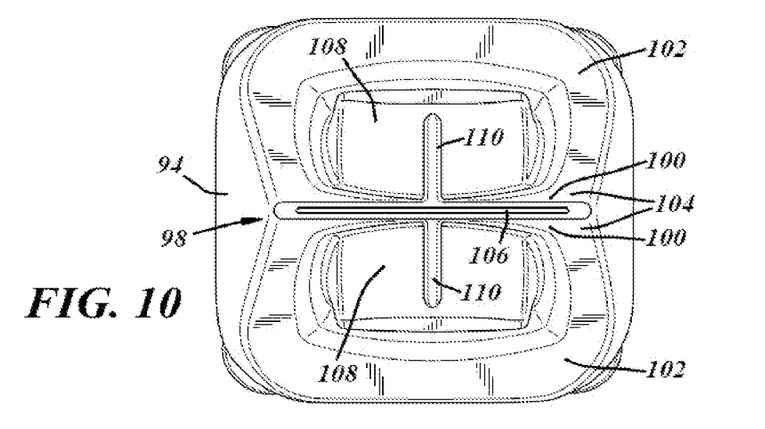
FIG. 10 is a bottom view of the drain valve.
Figure 11:
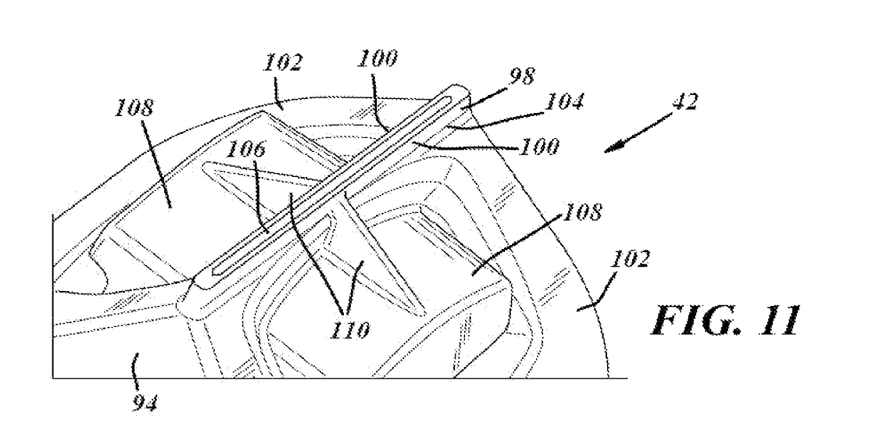
FIG. 11 is an enlarged bottom perspective view of the drain valve.

In the embodiment of the drain valve 42 that is shown in FIGS. 9-11, the drain valve 42 includes a drain body 94 that is mounted to the housing 22 at or adjacent to an outward end of the drain chamber 36. The drain body 94 is open at its upper end 96 and material in the drain chamber 36 flows into the drain body 94. To control the flow of matter through the drain body 94, the lower end 98 of the drain body 94 includes a valve element that is selectively opened. In the example shown, the valve element is defined by a pair of opposed flaps 100 that are spaced apart at a first end 102, that is connected to the remainder of the drain body 94, and which are engaged, when the valve element is closed, at their second ends 104. As shown, the flaps 100 are cantilevered from the drain body 94 and arranged in a so-called "duck bill" type valve in which the second ends 104 of the flaps 100 are generally linear and engaged along their length to define a narrow but relatively long slot 106 between them. Either the opening in the housing that leads to the drain chamber or the slot 106 may define the second outlet.

The flaps 100 are formed such that one or both of the second ends 104 may move relative to the other to separate the flaps 100 and provide an opening through which particulate exits the drain valve 42. In the example shown, the flaps 100 are formed from a flexible material and can flex when sufficient force is applied to them, to separate at least partially and allow particulate to drain from the valve 42. To facilitate opening of the drain valve 42, weights 108 are carried by the drain body 94. In the example shown, two separate weights 108 are provided with one weight carried by each flap 100. The weights 108 may be formed from a different material than the drain body 94 and may be attached to the drain body 94 in any desired manner, and are shown as being overmolded by, and thus embedded in, the material of the drain body 94 (e.g. the weights 108 may be inserts in an insert molding process in which the material of the drain body 94 is molded onto and over the weights 108). In the direction of gravity, the weights 108 are at least partially offset from the second ends 104, and provide a force on the flaps 100 that tends to separate the flaps 100. The weights 108 may also increase vibrations on the drain valve 42 to break up any compacted matter in the drain chamber to facilitate emptying the drain chamber when the valve is open. Further, the flaps 100 may include support walls 110 between the weights 108 and the free ends, and generally centered in the length of the flaps 100 to direct forces to the flaps 100 in a desired manner (e.g. to the center of the flaps 100 where the flaps 100 are most flexible). The support walls 110 may be integrally formed, from the same material as the remainder of the drain body 94. Further, in at least some implementations, the weights 108 are defined by thicker portions or the drain body 94. That is, the weights 108 may be formed from the same material as the drain body 94 and need not include a different material or different component carried by (e.g. embedded in) the drain body 94.

Thus, while the flaps 100 may be normally closed, a lesser force is needed to separate the flaps 100 than would be the case if the weights 108 were not provided. As used herein, the term "normally closed" means that, absent an outside force on the drain body 94, the flaps 100 will be engaged with each other to at least inhibit flow out of the drain valve 42. In use, air flowing in the system, and/or vibrations from the operating engine and engine components, provide forces on the drain valve 42 that at least partially separates the flaps 100. This may occur without requiring manual opening of the drain valve 42 and without requiring an actuator, like an electro-mechanical device (e.g. a solenoid) to drive the flaps 100 to an open position. Thus, in normal use of the vehicle, the flaps 100 may separate sufficiently to drain at least some of the particulates from the housing 22, which at least reduces the volume of particulates that reaches the filter 14. But the flaps 100 may also close to reduce hot air intake into the housing 22 through the valve which can decrease engine power output and efficiency.

So constructed and arranged, the particulate separator 20 removes from air flowing to the air filter 14, at least some of the particulates. The air guide 44 is designed to provide a low restriction to air flow with narrowing blades (thinner at downstream edge) and sufficient space 82 between the blades to readily permit air flow through the air guide 44 while directing air in a manner to improve particulate separation. Further, the housing 22 has a sufficient length to provide a distance between the air guide 44 and outlet body 74 that enables movement of particles outwardly toward the inner surface 28 of the housing 22 before reaching the outlet body 74, so that more particles move into the space 82 and not through the central passage 80. Further, the particle guide(s) help to both move particles to the drain chamber 36 and may also limit air flow into the drain chamber 36 to limit air loss through the drain chamber 36. The air flow to the engine is thus not unduly restricted and engine power output is less effected. In at least some implementations, engine power output is affected by less than two percent with the particle separator 20 as described herein compared to an engine air cleaner without such a particle separator 20.

What is claimed is:
1. A particulate separator assembly, comprising:
a housing having an interior, an inlet through which air enters the interior, a first outlet adapted to communicate with an air filter, and a second outlet;
an air guide carried by the housing between the inlet and the first outlet, the air guide has multiple deflectors that define multiple flow paths between adjacent ones of the multiple deflectors, the flow paths communicating with the interior of the housing; wherein the deflectors cause a spiral or helical or circular movement of the air as the air flows through the interior;
an outlet body having a central portion and a wall extending outwardly from the central portion, wherein the central portion is received at least partially within the interior of the housing with a space defined between an outer surface of the central portion and an inner surface of the housing, and the central portion has an opening through which air flows through the outlet body, and the wall encloses the space so that air that flows around the central portion is blocked by the wall; and
a particulate guide radially spaced from an outer surface of the central portion and wherein the particulate guide is located above the second outlet with respect to gravity and arranged to direct particulates in an airflow within the space toward the second outlet, wherein the particulate guide is one of multiple particulate guides and wherein a circumferentially extending gap exists between adjacent particulate guides, where circumferentially is with reference to the axis.
2. The assembly of claim 1, wherein the second outlet communicates with the space and the second outlet is formed through a lower portion of the housing relative to gravity.

3. The assembly of claim 2 wherein each particulate guide extends axially from the wall relative to an axis of the opening through the central portion.

4. The assembly of claim 3 wherein the central portion, wall and each particulate guide are all provided in the same piece of material.

5. The assembly of claim 1 wherein the deflectors are radially arranged relative to a central axis of the air guide, and the deflectors are tapered and have a leading edge is thicker than a trailing edge, where the thickness is measured in the circumferential direction.

6. The assembly of claim 5 wherein the deflectors are connected at a radially inner edge to a central body that has a smaller cross-sectional area at an upstream end than at a downstream end, where upstream and downstream are relative to the primary direction of air flow through the air guide, and wherein the radially inner edge of the deflectors is at a non-zero angle to the axis.

7. The assembly of claim 5 wherein the trailing edge has a circumferential thickness that is one-third or less than the circumferential thickness of the leading edge.

8. The assembly of claim 1 wherein the housing interior has a central axis and an axial length of the interior between the air guide and the outlet body is at least 3 times greater than the axial length of the air guide.

9. The assembly of claim 1 wherein the particulate guide is one of multiple particulate guides and wherein a gap exists between adjacent particulate guides.

10. The assembly of claim 1 wherein at least one of the particulate guides partially covers the second outlet and inhibits material from flowing into the housing interior through the second outlet.

11. An engine air cleaner assembly, comprising:
a main housing having an interior;
an air filter received in the interior of the main housing;
a separator housing that has an interior in communication with the main housing interior, the separator housing also having an inlet through which air enters the interior, a first outlet adapted to communicate with an air filter, and a second outlet;
an air guide carried by the separator housing between the inlet and the first outlet, the air guide has multiple deflectors that define multiple flow paths between adjacent ones of the multiple deflectors, the flow paths communicating with the interior of the separator housing; wherein the deflectors cause a spiral or helical or circular movement of the air as the air flows through the interior; and
an outlet body having a central portion and a wall extending outwardly from the central portion, wherein the central portion is received at least partially within the interior of the separator housing with a space defined between an outer surface of the central portion and an inner surface of the separator housing, and the central portion has an opening through which air flows through the outlet body, and the wall encloses the space so that air that flows around the central portion does not exit through the first outlet, wherein one or more of (a), (b) and/or (c) is present:

a) the deflectors have a leading edge upstream of a trailing edge and the leading edge of at least some of the deflectors is circumferentially thicker than the trailing edge, wherein the deflectors are connected at a radially inner edge to a central body that has a smaller cross-sectional area at an upstream end than at a downstream end, where upstream and downstream are relative to the primary direction of air flow through the air guide, and wherein the radially inner edge of the deflectors is at a non-zero angle to the axis; or b) a particulate guide that is received over at least part of the second outlet, with respect to the direction of gravity, and within the space, wherein the particulate guide is radially spaced from an outer surface of the central portion and wherein the particulate guide is located above the second outlet with respect to gravity and arranged to direct particulates in an airflow within the space toward the second outlet, wherein the particulate guide is one of multiple particulate guides and wherein a circumferentially extending gap exists between adjacent particulate guides, where circumferentially is with reference to the axis; or c) the interior of the separator housing has a length between the air guide and the outlet body that is at least 3 times greater than the axial length of the air guide.

12. The assembly of claim 11 wherein the second outlet communicates with the space and the second outlet is formed through a lower portion of the separator housing relative to gravity.

13. The assembly of claim 11 wherein a cross-sectional area of the air guide, taken in a plane perpendicular to the axis, is less than fifteen percent of the total area bounded by the air guide.

14. The assembly of claim 13 wherein a cross-sectional area of the air guide, taken in a plane perpendicular to the axis and through a leading edge of the deflectors, is greater than a cross-sectional area of the air guide taken in a plane perpendicular to the axis and through a trailing edge of the deflectors.

* * * * *